Patented Jan. 27, 1942

2,271,356

UNITED STATES PATENT OFFICE 2,271,356

HYDROCARBON CONVERSION

John Turkevich, Princeton, N. J., and Robert F. Ruthruff, Chicago, Ill., assignors to Process Management Company, Inc., Wilmington, Del., a corporation of Delaware No Drawing. Application June 29, 1940, Serial No. 343,170

11 Claims. (Cl. 260—668)

This invention relates to improvements in processes utilizing chromium oxide catalysts. More particularly, the invention relates to improvements in processes for changing the carbon-hydrogen ratio of hydrocarbons. Still more particularly, the invention relates to the dehydrogenation of gaseous and liquid hydrocarbons for the production of olefinic and aromatic hydrocarbons.

Chromium oxide has been used extensively as a catalyst in reactions involving organic compounds and particularly in the hydrogenation and dehydrogenation of hydrocarbons. Chromium oxide catalysts prepared in a gel form have been used particularly in dehydrogenating reactions. Gel-type chromium oxide catalysts have been produced by the slow precipitation of the gel in a dilute solution of a chromium salt, usually chromium nitrate, by means of hydroxides such as ammonium hydroxide. Other methods for the production of the chromium oxide gels include formation of a chromium acetate solution, as by the addition of ammonium acetate or acetic acid to a chromium salt solution, and neutralization of the acetate solution, as by the addition of ammonium hydroxide. The gelatinous precipitate or jelly obtained by these methods is washed and dried to form dense granular particles which may be employed as such as catalytic material.

It is an object of this invention to provide a process utilizing a chromium oxide catalyst wherein the reactants are contacted with chromium oxide which is superior in catalytic activity to chromium oxide catalysts heretofore produced. It is a further object of the invention to provide a process for the conversion of aliphatic hydrocarbons having at least six carbon atoms per molecule to aromatic hydrocarbons by dehydrogenation and cyclization reactions under conditions whereby a substantially improved degree of conversion is effected.

The chromium oxide catalyst employed in the process of the invention is prepared by the reduction of chromium trioxide in an aqueous solution thereof. Reduction is accomplished by means of one or more of a variety of reducing agents. Preferably a reducing agent is employed which is volatile, or decomposes to form materials which are volatile, at relatively low temperatures and forms oxidation by-products which are themselves volatile at relatively low temperatures, such as the low-boiling alcohols and aldehydes and oxalic acid. Other reagents which are highly reactive and are removable by other means and which form removable or innocuous oxidation products may be used.

Production of the improved chromium oxide catalyst in its most active form is effected under conditions whereby substantial reduction of the chromium trioxide is effected. In the reduction of chromium trioxide in aqueous solution a primary reduction product may be formed which is unsuitable for catalytic purposes and requires more strenuous conditions to effect further reduction to the desired degree. For example, in the reduction of chromium trioxide in aqueous solution by means of ethyl alcohol it is found that an intermediate product may be formed which may be chromium chromate. This material may be formed by the reaction of chromium which has been reduced to the trivalent form with unchanged chromium trioxide. This compound apparently forms a reduction barrier which requires a higher reduction potential to convert it to a compound in which the chromium has a lower valence.

Reduction of chromium trioxide under conditions favoring substantial reduction to the trivalent form results in the formation of a gelatinous precipitate. If a fairly concentrated solution of the chromium trioxide is employed the precipitate may occupy the volume of the solution as a jelly. The presence of the intermediate compound, which will be referred to as chromium chromate for purposes of identification, in the precipitate may be detected by a thermal analysis of this material. For example, if after suitable washing and drying of the gel at low temperature to produce the granular product the latter is heated slowly to a temperature of around 200° C. there occurs an exothermic reaction which varies in intensity with the proportion of chromium chromate present. When the material contains a substantial proportion of chromium chromate the exothermic reaction is vigorous enough to raise the temperature of the mass 100° or more in about one minute. This thermal effect is not to be confused with the glow phenomenon which is noticed in the heating of chromium oxide gels to temperatures in the neighborhood of 500° C. A sample of material prepared as described may exhibit both of these phenomena as the temperature is raised first to approximately 200° C. and then to about 500° C.

It is desirable to avoid the presence of a large proportion of the intermediate chromium chromate in the catalyst since it is found that the greatest activity is associated with substantially complete absence of this material in the catalyst although catalysts may be prepared containing certain amounts of the chromium chromate, which may be tolerated because the activity of the catalyst still is substantially greater than chromium oxide catalysts employed heretofore.

Where it is found, by thermal analysis of the product, that the reducing conditions are not adequate to effect reduction of the chromium trioxide to the desired degree various means may be employed to increase the degree of reduction. These include the use of reducing agents of greater activity, the use of greater amounts of the reducing agent, the use of a higher temperature, or the use of a longer period of application of heat in the presence of the reducing agent. For example, in the reduction of chromium trioxide in aqueous solution by means of ethyl alcohol it is found desirable to boil the solution containing alcohol under reflux in order to effect the production of a catalyst of highest activity. By this means the temperature is maintained sufficiently high for a sufficient length of time to reduce substantially all the chromium chromate, formed by the reduction of chromium trioxide to precipitate a gelatinous chromium oxide product which is substantially free from chromium chromate. Prolonged heating at high temperature beyond the time necessary to effect substantially complete reduction of the chromium trioxide is not desirable, however, as this may result in the production of a catalyst having an activity less than the maximum.

The invention will be described in more detail by reference to the preparation of various catalysts made in accordance with the present invention and in accordance with prior processes and to dehydrogenation operations employing such catalysts. It will be understood, however, that the invention is not limited by such specific examples but is directed broadly to processes utilizing chromium oxide catalysts.

In the further description of the invention reference will be made to the preparation and use of various chromium oxide catalysts which were prepared as follows:

CATALYST A 160 grams of chromium trioxide were dissolved in 2 liters of water. Eight 10 cc. portions of ethyl alcohol were added with shaking at 5-minute intervals. The preparation became dark brown in color, and considerable heat was evolved. After addition of the 8th portion of alcohol the reaction mixture was allowed to stand for four hours after which 80 cc. of alcohol were added exactly as before. The reaction mixture was then boiled under reflux for 16 hours. A dark brown precipitate was formed. Thereafter 40 cc. more of alcohol were added, and boiling under reflux was resumed for 24 hours, and the precipitate remained a dark brown. After filtration and drying at 120° C. the precipitate was converted to a granular material which was bluish-black in color.

CATALYST B 40 grams of chromic acid, $CrO_3$, were dissolved in 2 liters of distilled water and 20 cc. of ethyl alcohol were added. The solution on standing turned dark in color and evolved acetaldehyde. The solution was boiled for some time until active evolution of aldehydes ceased and then was permitted to stand for two weeks. Thereafter 30 cc. of ethyl alcohol were again added, and the solution was warmed on a hot plate for two days until the odor of acetaldehyde disappeared again. A dark brown precipitated suspension was obtained which on filtration set to a brown gel. This was washed with stirring with 2 liters of hot water. After filtration and drying at 110° C. overnight a black granular gel-type material was obtained.

CATALYST C 40 grams of chromic acid were dissolved in 250 cc. of water. 56.5 grams of oxalic acid were added gradually during the course of one day. After the reaction had slowed down the mixture was placed on a hot plate and evaporated to dryness. A jet-black granular material was thus obtained. It should be noted that in this preparation the oxalic acid was employed in a molecular ratio to the chromic acid of 1.1 to 1.0. It was found that the use of this ratio of materials produced a catalyst superior in activity to those produced by the use of oxalic acid and chromic acid in different ratios.

CATALYST D 100 grams of chromium nitrate, nonahydrate, were dissolved in 500 cc. of water. 33 grams of ammonium acetate were dissolved in 135 cc. of water. The two solutions were then intimately mixed. The combined solution was heated to boiling after which 90 cc. of concentrated ammonium hydroxide diluted with 250 cc. of water were quickly added with stirring. A strong homogeneous jelly was formed. This jelly was cut into cubes of intermediate size. The cubes were shrunk somewhat by heating at 50 to 60° C. for 12 hours. After cooling the cubes were washed by soaking in distilled water which was frequently changed. After nitrate and ammonium salts had been washed away the cubes were again heated at 50 to 60° C. for 12 hours at which time they were dried to a hard black vitreous material. Before use as a catalyst this material was heated overnight at 300° C.

CATALYST E

A chromium nitrate solution was prepared by dissolving 76 grams of chromium nitrate, nonahydrate, in 6 liters of water. To this solution there were added dropwise and with vigorous stirring about 6 liters of 0.1 normal ammonium hydroxide. The addition of the first half of the ammonium hydroxide to the chromium nitrate solution was carried out slowly at the rate of about 3 liters in 6 hours. Stirring was continued thereafter for about 4 hours to dissolve any precipitate formed. The remainder of the hydroxide was then added with continued stirring. On completion of the addition of the ammonium hydroxide the precipitate which was formed was allowed to settle and the excess liquid removed by decantation. The precipitate was then washed several times by agitation with fresh water followed by settling and decantation of the water. Washing was continued to the point of incipient peptization of the chromium oxide. The precipitate was then filtered and dried at 100° C. for several hours to convert it to the black relatively dense granular form. Before use the catalyst thus prepared was heated gradually to approximately 300° C. and held at that temperature for about 10 hours.

CATALYST F 100 grams of chromium acetate (Mallinckrodt's analytical grade) were dissolved in 500 cc. of water in a glass bottle. 100 cc. of concentrated ammonium hydroxide solution were added with stirring at room temperature. No precipitation occurred. The bottle was then closed and permitted to stand for 12 hours during which time a stiff black jelly formed. This precipitate was washed by decantation with large volumes of water. Ten such washings were effected before incipient peptization of the chromium oxide indicated that washing was complete. The product was then filtered, dried for 15 hours at 120° C. and finally up to 350° C. during 24 hours. The resulting product was a black granular rather hard material.

Catalyst G 160 grams of chromium trioxide were dissolved in 2000 cc. of water. Eight 10 cc. portions of ethyl alcohol were added with agitation at five-minute intervals after which the solution was allowed to stand four hours, an equal amount of alcohol then being added in the same manner. The solution was then heated on a steam bath under reflux for 15 hours at the end of which time the whole had set to a dark brown almost black gel. The gel was broken up and filtered and the voluminous precipitate was dried at 100° C. The shining jet-black lumps thus obtained were further dried by being heated to a temperature of 300° C. over a period of 4 hours and being held at that temperature for 10 hours. Before use the catalyst was conditioned in an atmosphere of nitrogen by raising it to a temperature of 300° C. in 4 hours, increasing the temperature at the rate of approximately 10° per hour to 400° C., holding the temperature at 400° C. for approximately 10 hours and then increasing the temperature at the rate of approximately 5° C. per hour to a final temperature of 500° C.

Catalyst H

Catalyst H was prepared in a manner substantially identical with the method of preparation of Catalyst G except that instead of heating the solution on a steam bath the reaction mixture was boiled vigorously under reflux. During this treatment the catalyst separated in the form of a dark brown, finely divided precipitate. This was separated by filtration, washed and dried, a black product being obtained. Before use the catalyst was conditioned in the manner described in connection with Catalyst G.

Catalyst H-1

Catalyst H-1 was prepared in a manner substantially identical with the preparation of Catalyst H except that instead of the conditioning treatment the dried material was placed in a quartz tube and then heated further in a stream of nitrogen, the heat input being so regulated that the temperature increased approximately 1° to 2° C. per minute. Heating in this manner caused the catalyst to undergo the glow phenomenon at a temperature of approximately 500° C., the mass exhibiting a temperature rise of approximately 200° C. in about one minute after glowing was initiated.

The glow phenomenon exhibited in the preparation of Catalyst H-1 is typical of the behavior of chromium oxide gels when heated in this temperature range, and, as pointed out above, is not to be confused with the exothermic temperature effect which may be exhibited by a catalyst, prepared in this manner at temperatures around 200° C. Actually, in the drying of Catalysts H and H-1 only a slight thermal effect was noticed as the temperature reached approximately 200° C. This indicated that the reducing conditions employed in the preparation of these catalysts were sufficiently severe to effect substantially complete reduction of all chromium chromate formed during the reaction as an intermediate product whereby the finished catalyst contained substantially none of this material. In the preparation of Catalyst G, however, reduction was not so complete with the result that the finished catalyst contained an appreciable but tolerable amount of chromium chromate. This was indicated by a sudden temperature rise of approximately 40° C. as the material was heated gradually to approximately 200° C.

Catalyst S

A 0.2 N solution (against alkali) of chromium nitrate was prepared by dissolving 152.4 grams of the nonahydrate in 6 liters of water. An ammonia solution of the same normality was prepared by diluting 77 cc. concentrated (29%) ammonium hydroxide with 6 liters of water. The chromium solution was rapidly stirred and the dilute alkali was added dropwise at a rate of 6 cc. a minute until 3 liters had been used. At this point addition of alkali was discontinued and the solution was stirred for 4 hours, following which the addition of alkali at the above rate was resumed. After a permanent precipitate had formed the remainder of the alkali was added rather rapidly. Due to variations in the water content of chromium nitrate nonahydrate, more or less than the specified amount of dilute alkali may be required for complete precipitation. The amount of nonahydrate specified above is based on the actual composition of the sample used. The gelatinous precipitate was allowed to settle and the supernatant liquid was removed as completely as possible, following which sufficient distilled water was added to bring the level up to the previous mark and the suspension was stirred for a half hour, allowed to settle, and the supernatant liquid was again removed. This method of washing was continued until the precipitate began to peptize, about six changes of water being required. The washed precipitate was sucked as dry as possible on a Büchner filter and then transferred to an oven, where it was kept at 100° C. for 24 hours. Before use the catalyst was stabilized by bringing it up to 300° C. over a course of 5 hours, following which it was maintained at this temperature for 10 hours.

Proper specific directions for carrying out reduction of the chromium trioxide to obtain the desired product are given in connection with the description of the preparation of Catalysts A, B, C, G and H. The proper conditions for using other reducing agents and for other concentrations of the chromium trioxide solution may be determined readily by those skilled in the art, it being understood that the reduction should be carried out under conditions sufficiently severe to limit the proportion of chromium chromate in the product to a tolerable amount. In following any method of preparation the presence of large amounts of chromium chromate in the product may be detected readily by a thermal analysis of a portion of the product in the manner described above. Where such thermal analysis results in a substantial exothermic reaction at about 200° C., indicating the presence of substantial amounts of chromium chromate, the procedure may be corrected by increasing the degree of severity of the reducing conditions, as described above.

Preferably, the concentration of the reagents used should be regulated whereby the solution, after being heated to promote the reduction reaction and remove volatile by-products, contains at least six grams of chromium per liter, for example, 40 grams of chromium per liter. Under these conditions the reduction of the trioxide to the desired degree converts the solution to a jelly which may be handled efficiently in further washing and drying operations.

Catalysts A, B, C, D, E and F were employed in the dehydrogenation of heptane under conditions which were substantially uniform. In these test operations Catalysts A, B and C were employed as representative of the catalyst of the new process while Catalysts D, E and F were employed as representative of prior processes employing chromium oxide catalysts prepared by other methods.

In the operations employing Catalysts A, B, C, D, E and F uniform quantities of the catalyst were employed and heptane was passed thereover at a feed rate which was substantially uniform. The reaction temperature was maintained at 475° C.

The gas produced in these operations contained 88 to 94% hydrogen, the remainder of the gas being principally methane. The rate of gas production was measured, and this was taken as an indication of the relative activity of the catalysts. The activity of the catalysts was measured also by analyses of the liquid products, taken at different intervals, for their content of olefins (heptene) and aromatics (toluene).

The results of the operations employing Catalysts A, B, C, D, E and F are set forth in Table I wherein the feed rate is given in terms of relative volumes of liquid heptane per minute, and the gas production is given in terms of relative volumes of gas.

Table I

| Catalyst | Feed rate | Gas production | | Analysis of liquid produced in $t$ min. | | |
|---|---|---|---|---|---|---|
| | | 1 hour | 2 hours | $t$ | Olefins | Aromatics |
| | | | | | Per cent | Per cent |
| A | 0.3 | 4,715 | | 30 | 13.4 | 41.5 |
| | | | | 60 | 13.5 | 32.9 |
| | | | | 75 | 9 | 31 |
| B | 0.33 | | 9,300 | 120 | 9 | 27 |
| C | 0.6 | | 6,800 | 120 | 9 | 19 |
| D | 0.3 | 2,850 | | 95 | 15.1 | 13.1 |
| E | 0.3 | 3,200 | 5,700 | 120 | 15 | 15 |
| F | 0.3 | 2,820 | | 30 | 12.8 | 25.5 |

The results summarized in Table I indicate the superiority of the new process, as exemplified by the operations employing Catalysts A, B and C, over prior operations, as exemplified by the operations employing Catalysts D, E and F. The relative volumes of gas produced indicate the superior activity of Catalysts A, B and C which is approximately 20 to 60% greater than that of Catalysts D, E and F. This superiority is indicated also by the analyses of the liquid products and particularly in connection with the percentage of aromatics in the liquid products. In evaluating the analyses of the liquid products set forth in Table I comparisons should be based on analyses of products taken over similar periods. Thus, the analysis of the product of Catalyst E should be compared to the analysis of the product of Catalyst B taken over a similar period, that is 120 minutes. This comparison indicates a production of aromatics in the operation employing Catalyst B almost twice that in the operation employing Catalyst E. Similarly, the analysis of the liquid product of the operation employing Catalyst F should be compared with the analysis of the liquid product of the operation employing Catalyst A taken in the same period, that is 30 minutes. This comparison indicates a production of aromatics by Catalyst A approximately 60% greater than that by Catalyst F.

Catalysts G, H, H-1 and S were also tested under uniform conditions in the dehydrogenation of heptane. In these tests heptane was passed in the vapor form over the catalysts at a space velocity of about 1 volume of liquid per volume of catalyst space per hour. The reaction temperature was approximately 475° C., and each operating run was was continued for a period of 5 hours. During each run the product was cooled continuously to separate liquids and gases, and the gases were collected and measured. The liquid product from each 2.5 hours was collected separately, and representative samples were analyzed for olefin and aromatic content. Representative samples of the gases produced were analyzed to show the content of hydrogen and hydrocarbons. Practically without exception the gases produced in these tests contained approximately 90% hydrogen, the remainder being principally methane.

After each 5-hour run the catalyst employed was revivified by burning from its surface carbonaceous deposits which accumulated during the run. In the operations employing Catalysts G, H and S revivification was effected by passing over the catalyst nitrogen gas containing 0.5 to 1.0% oxygen at temperatures not substantially above 500° C. In the revivification of Catalyst H-1 air was passed over the catalyst at the reaction temperature.

The results of the operations employing Catalysts G, H, H-1 and S for the dehydrogenation of heptane are set forth in Table II.

Table II

| Run | Catalyst G | Catalyst H | Catalyst H-1 | Catalyst S |
|---|---|---|---|---|
| | Relative volumes of gas produced | | | |
| 1 | 21,090 | 26,560 | 24,380 | 10,960 |
| 2 | 17,780 | 22,580 | 23,420 | 10,820 |
| 3 | 17,100 | 20,680 | 21,420 | 12,180 |
| 4 | 16,400 | 19,600 | 20,780 | 10,200 |
| 5 | 16,280 | 18,950 | 20,120 | 10,400 |
| 6 | 15,500 | 18,450 | 19,930 | 10,030 |
| 7 | 15,440 | 18,260 | 20,150 | 11,620 |
| 8 | 15,150 | 18,260 | 19,580 | 10,320 |
| 9 | 15,150 | 17,740 | 19,050 | 9,660 |
| 10 | 14,410 | 17,360 | 18,650 | 10,180 |
| 11 | 14,210 | 17,340 | 18,280 | 10,260 |
| 12 | 14,800 | 17,410 | 18,140 | |
| 13 | 13,960 | 16,600 | 17,180 | |
| 14 | | 16,210 | 17,050 | |
| 15 | | 16,580 | 17,320 | |
| 16 | | 16,560 | 16,630 | |
| 17 | | | 17,130 | |
| 18 | | | 16,520 | |
| 19 | | | 16,240 | |
| 20 | | | 16,120 | |
| 21 | | | 16,060 | |
| 22 | | | 15,950 | |
| 23 | | | 16,480 | |
| 24 | | | 15,670 | |
| 25 | | | 16,000 | |
| 26 | | | 15,750 | |
| 27 | | | 15,330 | |
| 28 | | | 15,380 | |
| 29 | | | 15,840 | |
| 30 | | | 15,210 | |
| 31 | | | 15,350 | |
| 32 | | | 15,100 | |
| 33–47 | | | 14,580 | |
| Average deviation, runs 33–47 percent | | | 1 | |

ANALYSES OF LIQUID PRODUCTS

| | Catalyst G | Catalyst H | Catalyst H-1 | Catalyst S |
|---|---|---|---|---|
| Percent olefins in 150 min | 17.3 (1) | 17.3 (1) | 12.2 (1) | 12.3 (1) |
| Percent aromatics in 150 min | 12.5 (1) | 20.8 (1) | 17.8 (1) | 9.3 (1) |
| Percent olefins in 150 min | 16.4 (10) | 15.9 (16) | 10.8 (46) | 12.9 (7) |
| Percent aromatics in 150 min | 9.8 (10) | 13.3 (16) | 12.9 (46) | 9.5 (7) |
| Percent olefins in 150–300 min | | 12.2 (16) | 7.9 (46) | 6.8 (7) |
| Percent aromatics in 150–300 min | | 3.9 (16) | 3.9 (46) | 0.8 (7) |

1 Average.

In the upper portion of Table II the relative volumes of gas produced in each 5-hour run employing the different catalysts are set forth. In the lower portion of Table II analyses of representative samples of the liquid products are set forth. The figures in parentheses indicate the number of the run from which the sample was taken.

The results summarized in Table II emphasize the superiority of the process employing the new catalyst over prior processes, as exemplified by the operation employing Catalyst S. Catalyst S was prepared by a method similar to the method of preparation of Catalyst E. The relative volumes of gas produced indicate that Catalyst H was slightly superior in activity to Catalyst G while both are substantially superior to Catalyst S. The difference in activity between Catalysts G and H probably is accounted for by incomplete reduction during the preparation of Catalyst G, as described above. Catalysts G, H and H-1 exhibited a gradual decline in activity to a stabilized level of activity during repeated runs. This decline in activity, however, is not sufficient to eliminate the margin of superiority of these catalysts over Catalyst S. Catalyst H-1 was tested during a series of 47 5-hour operating runs, each followed by revivification of the catalyst by means of air. The eventual stabilization of the activity of the catalyst is indicated by the average gas production during Runs 33 to 47, during which runs the relative volume of gas produced exhibited an average deviation of approximately 1%. Catalyst H-1 was therefore stabilized at a level of activity approximately 40% greater than the stabilized activity of Catalyst S. This margin of superiority of Catalyst H-1 over Catalyst S is based on the stabilized level of activity of Catalyst H-1. In addition to this margin of superiority Catalyst H-1, during the first 32 runs, exhibited a margin of superiority over the stabilized activity of Catalyst S varying from approximately 50% to approximately 140%.

The superiority of the process employing Catalysts G, H and H-1 over the process employing Catalyst S is further shown by consideration of the analyses of the liquid products of these operations as exemplified particularly by the percentages of aromatics in the products. Analyses of the liquid products collected in the first half of the first run on each catalyst indicate a production of aromatics by Catalysts G, H and H-1 of 30 to 200% greater than the production of aromatics in the operation employing Catalyst S. This superiority is further emphasized by consideration of the percentage of aromatics in the liquid products of the last half of later runs. For example, the liquid products of the last half of Run 16 on Catalyst H and Run 46 on Catalyst H-1 contained approximately 4% aromatics whereas the liquid product of the last half of a good run on Catalyst S contained less than 1% aromatics.

The foregoing data indicate that the process of the present invention is of particular advantage in the conversion of aliphatic hydrocarbons containing at least six carbon atoms per molecule to aromatic hydrocarbons. In carrying out the conversion of aliphatic hydrocarbons to aromatic hydrocarbons the hydrocarbons are contacted with the catalyst at temperatures within the range of 300° C. to 600° C. (preferably 450° C. to 550° C.) at a space velocity which, while sufficient to effect production of aromatics at a substantial rate, is sufficiently low to produce a substantial proportion of aromatics in the liquid product. In the temperature range mentioned the rate of conversion of aliphatic hydrocarbons to aromatic hydrocarbons varies inversely to the space velocity and directly with the temperature. At low temperatures within this range, therefore, a low space velocity should be employed while at higher temperatures a higher space velocity may be used although these factors are governed also by the character of the material treated and the nature of the product desired. In general, the space velocities employed in this temperature range will fall within the range of 0.1 to 3 volumes of aliphatic hydrocarbons (liquid basis) per volume of catalyst space per hour. The most advantageous space velocities will be found in the range of 1 to 2 volumes of liquid per volume of catalyst per hour.

The new process is particularly useful in the treatment of gasoline motor fuel to improve its anti-knock qualities. As an example of this application of the process there is set forth in Table III the results of the treatment of an East Texas virgin naphtha by contact at various temperatures with Catalyst H-1. The naphtha approximated commercial gasoline in boiling characteristics having initial and end boiling points of 32° C. and 202° C., respectively, and a Reid vapor pressure of 5.1 pounds per square inch. In preparation for all but one of the operations referred to the naphtha was fractionated to separate the lower boiling portion thereof and leave a topped naphtha, consisting of about 85% of the total naphtha, having initial and final boiling points of 98° C. and 211° C., respectively. After dehydrogenation of the topped naphtha it was blended with the low-boiling constituents, previously separated by fractionation, in order to reconstitute the total naphtha.

Table III

Dehydrogenation of topped East Texas virgin naphtha

| Temp. | Feed | Space velocity | Hours | Total gas | Percent hydrogen | C. E. R. M. octane number | |
|---|---|---|---|---|---|---|---|
| | | | | | | Topped naphtha | Total naphtha |
| 475° C. | Topped naphtha. | 0.25 | 5 | 9,650 | | 59.6 | 61.5 |
| 500° C. | ....do........ | 0.50 | 5 | 13,880 | 88.2 | 58.0 | 61.2 |
| 500° C. | ....do........ | 0.50 | 2 | 8,430 | 88.2 | 59.6 | 63.2 |
| 500° C. | ....do........ | 0.25 | 5 | 11,500 | 86.2 | 63.7 | 65.0 |
| 500° C. | Total naphtha. | 0.25 | 5 | 10,880 | 85.8 | | 65.8 |
| 500° C | Topped naphtha. | 0.15 | 5 | 9,830 | 84.3 | 67.7 | 68.2 |
| 525° C. | ....do........ | 1.00 | 5 | 22,790 | 84.8 | 60.9 | 63.0 |
| 525° C. | ....do........ | 1.00 | 1 | 8,620 | 84.8 | 61.9 | 63.8 |
| Feed.. | | | | | | 47.4 | 56.7 |

In Table III space velocity is expressed in terms of volumes of liquid feed per hour per volume of catalyst space. Gas production is given in terms of relative volumes of gas produced during the run, whose duration is indicated in the column under "Hours." The percentage of hydrogen in the gas is also indicated. The runs varied in length from 1 to 5 hours. Between runs the catalyst was revivified by treatment with air at reaction temperatures.

The reactions involved in the treatment of the naphtha were primarily dehydrogenation reactions, as shown by the fact that the gas produced at the highest temperature contained 85% hydrogen. The liquid yield obtained in the run at 0.15 space velocity was over 88% by volume.

The process is also advantageous for the dehydrogenation of hydrocarbon gases. As an example of this application of the process reference is made to the results of operations employing a catalyst, prepared in a manner similar to the preparation of Catalyst G, which was treated to subject it to the glow phenomenon, in the manner described in connection with the preparation of Catalyst H-1. This catalyst may be designated for identification as Catalyst G-1. In these operations butane was subjected to contact with Catalyst G-1 at various temperatures and gas space velocities with the results which are set forth in Table IV.

Table IV

| Gas space velocity | Percent olefins at 450° C. | | Percent olefins at 475° C. | | Percent olefins at 500° C. | |
|---|---|---|---|---|---|---|
| | 1st hr. | 5 hrs. | 1st hr. | 5 hrs. | 1st hr. | 5 hrs. |
| 600 | 9.8 | 6.0 | 14.0 | 7.4 | 14.2 | 4.9 |
| 800 | 10.0 | 5.2 | 12.4 | 7.4 | 13.4 | 4.7 |
| 1,200 | 6.4 | 3.1 | 12.0 | 4.9 | 12.1 | 3.5 |

In Table IV the gas space velocity is given in terms of volumes of gas at standard conditions of temperature and pressure per volume of catalyst space per hour. The results are expressed in terms of per cent olefins in the product during the first hour and during the full 5-hour run. Between runs Catalyst G-1 was revivified by treatment with air at the reaction temperature.

The operations whose results are set forth in the foregoing tables illustrate clearly the advantages of the process employing the chromium oxide catalyst prepared by reduction of chromium trioxide in aqueous solution. These advantages reside principally in the fact that in the operation of the present invention it is possible to obtain a degree of conversion which is greater than the degree of conversion obtained in prior processes when operating under the same conditions of temperature, pressure, space velocity, etc.

In the operation of the process the improved chromium oxide catalyst may be employed in the form of the chromium oxide as such, or the latter may be employed in combination with other materials which act as supports for the chromium oxide. Such supporting materials may be inactive or may also contribute to the catalytic effect to an equal or lesser degree than the chromium oxide. Particularly suitable for such supporting materials are oxides of certain metals of the second, third and fourth groups. In addition the chromium oxide may be employed in connection with other catalytically active materials which supplement or promote the activity of the chromium oxide. Certain oxides of metals of the fourth, fifth and sixth groups are suitable for this purpose.

These advantages and many other advantages accruing in the practice of the invention will be apparent from a consideration of the foregoing description and reference to the results of the practical application of the process. It is to be understood, however, that this invention is not limited by such reference to specific operations but is of broader scope and is susceptible of applications other than those specifically described.

This application is a continuation-in-part of our prior application Serial No. 181,598, filed December 24, 1937, now Patent No. 2,211,302, dated August 13, 1940.

We claim:

1. A process for dehydrogenating hydrocarbons which comprises contacting said hydrocarbons at elevated temperature with a catalyst comprising gel-type chromium oxide prepared by reacting chromium trioxide and a reducing agent in aqueous solution to form a gelatinous reduction product and drying said gelatinous product.

2. A process for converting aliphatic hydrocarbons to aromatic hydrocarbons which comprises contacting aliphatic hydrocarbons having at least 6 carbon atoms per molecule at elevated temperature with a catalyst comprising gel-type chromium oxide prepared by reacting chromium trioxide and a reducing agent in aqueous solution to form a gelatinous reduction product and drying said gelatinous product.

3. A process for changing the carbon-hydrogen ratio of hydrocarbons which comprises contacting said hydrocarbons at elevated temperature with a catalyst comprising gel-type chromium oxide prepared by reacting chromium trioxide and a reducing agent in aqueous solution to form a gelatinous reduction product and drying said gelatinous product.

4. A process for promoting reactions of organic materials which are susceptible to the catalytic effect of an active chromium oxide catalyst which comprises contacting said organic materials at elevated temperature with a catalyst comprising gel-type chromium oxide prepared by reacting chromium trioxide and a reducing agent in aqueous solution to form a gelatinous reduction product and drying said gelatinous product.

5. A process for dehydrogenating hydrocarbons which comprises contacting said hydrocarbons at elevated temperature with a catalyst comprising chromium oxide prepared by reacting chromium trioxide and a low-boiling alcohol in aqueous solution to produce a gelatinous chromium oxide reduction product and drying said gelatinous product.

6. A process for dehydrogenating hydrocarbons which comprises contacting said hydrocarbons at elevated temperature with a catalyst comprising chromium oxide prepared by reacting chromium trioxide and a reducing agent therefor in aqueous solution under conditions suitable to effect the production of a gelatinous chromium oxide reduction product substantially free of chromium chromate and drying said gelatinous product.

7. A process for dehydrogenating hydrocarbons which comprises contacting said hydrocarbons at elevated temperature with a catalyst comprising chromium oxide prepared by boiling an aqueous solution of chromium trioxide and ethyl alcohol to effect the production of a gelatinous chromium oxide reduction product substantially free of chromium chromate and drying said gelatinous product.

8. A process for improving the anti-knock value of gasoline which comprises contacting at least a fraction of said gasoline at elevated temperature with a catalyst comprising chromium oxide prepared by reacting chromium trioxide and a reducing agent in aqueous solution to form a gelatinous chromium oxide reduction product and drying said gelatinous product.

9. A process for dehydrogenating normally gaseous hydrocarbons which comprises contacting said normally gaseous hydrocarbons at elevated temperature with a chromium oxide catalyst comprising chromium oxide prepared by reacting chromium trioxide and a reducing agent in aqueous solution to form a gelatinous chromium oxide reduction product and drying said gelatinous product.

10. A process for dehydrogenating hydrocarbons which comprises contacting said hydrocarbons at elevated temperature with a catalyst comprising chromium oxide prepared by reacting chromium trioxide and oxalic acid in aqueous solution in the molecular ratio of approximately 1.1 molecules of oxalic acid to 1 molecule of chromium trioxide to effect production of a gelatinous reduction product and drying said gelatinous product.

11. A process for dehydrogenating aliphatic hydrocarbons which comprises contacting said hydrocarbons at elevated temperature with a catalyst comprising a gel-type chromium oxide prepared by reacting chromium trioxide and a reduction agent therefor in aqueous solution to precipitate a gelatinous chromium oxide reduction product, separating said supernatant liquid from said precipitate and then drying said separated precipitate.

JOHN TURKEVICH.
ROBERT F. RUTHRUFF.